United States Patent
Koshy (10) Patent No.: US 9,590,702 B2
(45) Date of Patent: Mar. 7, 2017

(54) SHORT RANGE WIRELESS COMMUNICATION USING SCATTERING FROM SINGLE WIRE TRANSMISSION LINE

(71) Applicant: KFX CIRCUITS AND SYSTEMS PRIVATE LIMITED, Bangalore (IN)

(72) Inventor: Nishil Thomas Koshy, Bangalore (IN)

(73) Assignee: KFX CIRCUITS AND SYSTEMS PRIVATE LIMITED, Karnataka (IN)

( * ) Notice: Subject to any disclaimer, the term of this patent is extended or adjusted under 35 U.S.C. 154(b) by 0 days.

(21) Appl. No.: 14/420,735

(22) PCT Filed: Aug. 14, 2013

(86) PCT No.: PCT/IN2013/000497
§ 371 (c)(1),
(2) Date: Feb. 10, 2015

(87) PCT Pub. No.: WO2014/027369
PCT Pub. Date: Feb. 20, 2014

(65) Prior Publication Data
US 2015/0195014 A1 Jul. 9, 2015

(30) Foreign Application Priority Data
Aug. 17, 2012 (IN) .......................... 3402/CHE/2012

(51) Int. Cl.
H04B 5/00 (2006.01)
H01Q 9/27 (2006.01)
(Continued)

(52) U.S. Cl.
CPC ............. *H04B 5/0081* (2013.01); *H01Q 9/27* (2013.01); *H04B 5/0018* (2013.01); *H04W 4/008* (2013.01); *H04W 52/0229* (2013.01)

(58) Field of Classification Search
CPC ...... H04W 4/008; H04W 92/18; H04W 88/02
(Continued)

(56) References Cited

U.S. PATENT DOCUMENTS

7,994,659 B2 * 8/2011 Breitfuss ............ G06K 7/10237
307/151
2006/0283948 A1 * 12/2006 Naito .......................... 235/451
(Continued)

*Primary Examiner* — Nay A Maung
*Assistant Examiner* — Angelica M Perez
(74) *Attorney, Agent, or Firm* — Barry Choobin; Patent 360 LLC (57) ABSTRACT

The various embodiments herein provide a system and method for providing short range wireless communication. The system comprises a transmitting end, a first electrical circuitry provided at the transmitting end to generate a propagating EM wave on a connected wire according to an input data signal, a transmitting antenna provided at the transmitting end designed to maximize scattering of the propagating EM wave, a receiving end, a receiving antenna provided at the receiving end to detect the scattered EM wave and a second electrical circuitry provided at the receiving end to recover the input data signal from the signal received by the receiving antenna. Here a wireless link is established by means of the scattered EM waves generated by near field emissions from a surface of the transmitting antenna.

5 Claims, 7 Drawing Sheets (51) Int. Cl.
*H04W 4/00* (2009.01)
*H04W 52/02* (2009.01)

(58) Field of Classification Search
USPC .................. 455/41.1–41.3; 343/702, 806
See application file for complete search history.

(56) References Cited

U.S. PATENT DOCUMENTS

| | | | |
|---|---|---|---|
| 2009/0228608 A1* | 9/2009 | Nysen | H01Q 1/22 710/1 |
| 2011/0250838 A1* | 10/2011 | Alexopoulos et al. | 455/41.1 |
| 2014/0011447 A1* | 1/2014 | Konanur | H04B 5/00 455/41.1 |

* cited by examiner

SHORT RANGE WIRELESS COMMUNICATION USING SCATTERING FROM SINGLE WIRE TRANSMISSION LINE

CROSS REFERENCE TO RELATED APPLICATIONS

The present patent application claims the priority of the Indian Provisional Patent Application No. 3402/CHE/2012 filed on 17 Aug. 2012. This patent application is a U.S. National Phase Application under 35 U.S.C. 371, of the PCT International Application No. PCT/IN2013/000497 filed on 14 Aug. 2013, and titled "Short Range Wireless Communication Using Scattering from Single Wire Transmission Line".

BACKGROUND

Technical Field

The embodiments herein generally relate to wireless communication and particularly relates to a short range wireless communication. The embodiments herein more particularly relates to a method and system for providing short range wireless communication using a single wire transmission line.

Description of the Related Art

Generally a wireless communication refers to a transmission of information over a wireless communication technology. The examples for a wireless communication technology include a Bluetooth, an Infrared Data Association (IrDA), Wireless Fidelity (Wi-Fi), a Near Field Communication (NFC) and the like.

The conventional schemes for providing wireless communication rely on creating strong electric and magnetic fields on specially designed antennas for generating electromagnetic waves that radiate out from the antenna. This requires antennas to be designed specific to the frequency of operation with the range being controlled primarily by adjusting the strengths of the electric and the magnetic fields. For short ranges, the complexity of this method and power required to generate the electric and magnetic fields sometimes become a major drawback.

Also, the conventional radio transmitter uses an impedance matched antenna connected to an RF power amplifier to convert the electrical signals into electromagnetic waves that are further broadcasted wirelessly.

In view of the foregoing, there is a need for a method and system for converting electrical signals directly into propagating waves and transmitting the same using a single conductor. There is also a need to provide a communication scheme for providing an increased range and higher data rates over a short range wireless network. Further, there is also a need for a short range wireless communication which eliminates the need to design frequency specific antennas as well as impedance matching circuits for driving these antennas. Still further, there is a need for a communication scheme to reduce the power consumption of the short range wireless network during data transmission.

The above mentioned shortcomings, disadvantages and problems are addressed herein and which will be understood by reading and studying the following specification.

OBJECTIVES OF THE EMBODIMENTS

The primary object of the embodiments herein is to provide a short range wireless communication using scattering from a single wire transmission line.

Another object of the embodiments herein is to provide a method and system for providing an increased range and higher data rates over the conventional wireless networks.

Yet another object of the embodiments herein is to provide a method and system for reducing the rate of power consumption involved in a signal transmission process.

Yet another of the embodiments herein is to provide a high speed short range wireless communication.

Yet another of the embodiments herein is to provide a communication scheme which is simple and cost effective.

These and other objects and advantages of the embodiments herein will become readily apparent from the following detailed description taken in conjunction with the accompanying drawings.

SUMMARY

The various embodiments herein disclose a system for providing short range wireless communication. The system comprises a transmitting end, a first electrical circuitry provided at the transmitting end to generate a propagating EM wave on a connected wire according to an input data signal, a transmitting antenna provided at the transmitting end designed to maximize scattering of the propagating EM wave, a receiving end, a receiving antenna provided at the receiving end to detect the scattered EM waves and a second electrical circuitry provided at the receiving end to recover the input data signal from the signal received by the receiving antenna. Here the wireless link is established by means of the scattered EM waves generated by near field emissions from a surface of the transmitting antenna.

According to one embodiment herein, the transmitting antenna and the receiving antenna are conductor strips with a plurality of bends and high surface area.

According to one embodiment herein, the transmitting antenna is adapted to generate and the receiving antenna is adapted to receive EM waves using near field emissions.

According to one embodiment herein, the transmitting antenna and the receiving antenna are fractal antennas.

According to one embodiment herein, the transmitting antenna and the receiving antenna are adapted to provide longer range directional radio links.

The embodiments herein further provide a method for providing a short range wireless communication. The method comprises steps of providing a radio frequency (RF) carrier signal to a first input node, providing an input data signal to be transmitted to a second input node, generating an electrical disturbance using the input data signal, transmitting the signal disturbance to an output signal node, generating propagating wave at the output signal node and transmitting the generated propagating wave through a single wire transmission line. The scattering of energy from the single wire transmission line is achieved by introducing a plurality of bends in the wire, increasing the surface area of the wire and leaving the wire un-terminated.

According to one embodiment herein, the first electrical circuitry at the transmission end comprises a first switching transistor, a second switching transistor, a first resistor, a second resistor, a first capacitor, a second capacitor, a third capacitor, a first input node, a second input node, a supply voltage node and a ground node.

According to one embodiment herein, a radio frequency carrier signal is connected to the first input node and an input data signal is connected to the second input node.

According to one embodiment herein, the second switching transistor functions as an open circuit when the input data signal at the second input node is lower than the predetermined threshold value.

According to one embodiment herein, the second switching transistor functions as a closed circuit when the input data signal at the second input node is higher than the predetermined threshold value.

According to one embodiment herein, the switching transistor is at least one of a NPN transistor, a PNP transistor, an NMOS transistor, a PMOS transistor, a MOSFET transistor, a bipolar transistor or any voltage or current controlled switch.

According to one embodiment herein, the input data signal is one of an AC signal or a DC logic signal. The amplitude, a phase and a frequency of the input signal are varied according to a data obtained from the source network.

According to one embodiment herein, the scattered energy is a significant advancement for near field communication (NFC), radio frequency identification (RFID), Wireless Fidelity (Wi-Fi), Bluetooth etc.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The other objects, features and advantages will occur to those skilled in the art from the following description of the preferred embodiment and the accompanying drawings in which.

Although the specific features of the embodiments herein are shown in suite drawings and not in others. This is done for convenience only as each feature may be combined with any or all of the other features in accordance with the embodiments herein.

DETAILED DESCRIPTION OF THE DRAWINGS

In the following detailed description, a reference is made to the accompanying drawings that form a part hereof and in which the specific embodiments that may be practiced is shown by way of illustration. These embodiments are described in sufficient detail to enable those skilled in the art to practice the embodiments and it is to be understood that the logical, mechanical other changes may be made without departing from the scope of the embodiments. The following detailed description is therefore not to be taken in a limiting sense.

Figure 1A:
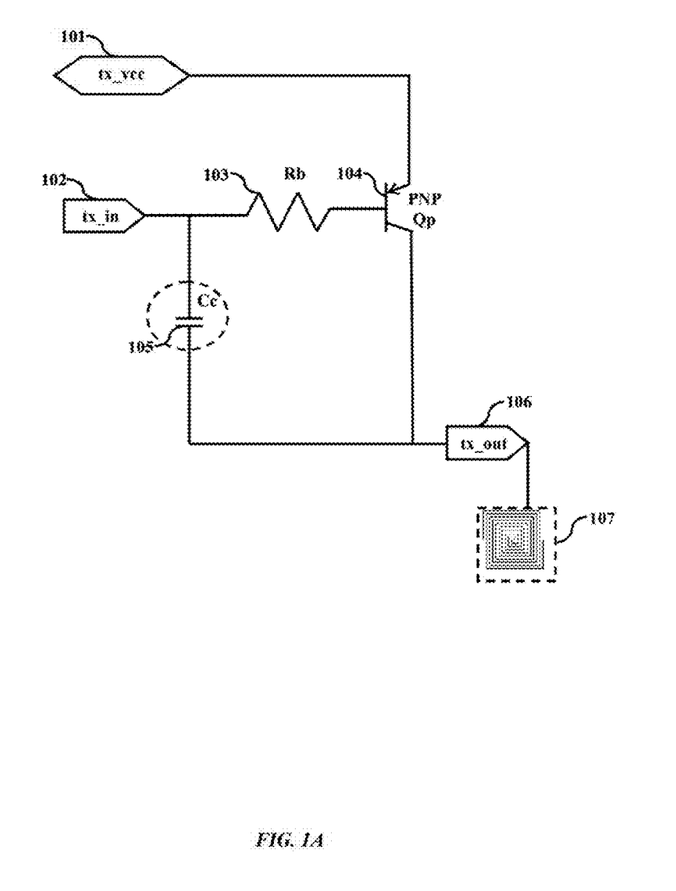
FIG. 1A is a schematic diagram illustrating a PNP transistor based impedance modulation circuit, according to one embodiment herein.

FIG. 1 is a schematic diagram illustrating a PNP transistor based impedance modulation circuit, according to one embodiment herein. With respect to FIG. 1, the impedance modulation circuit comprises a digital input signal node (tx_in) 102, a supply voltage node (tx_vcc) 101, a capacitor (Cc) 105, a resistor (Rb) 103 and a transistor (Qp) 104 at the transmitting end. The receiving end comprises an output signal node (tx_out) 106.

The digital input signal node (tx_in) 102 receives a digital signal in the term of a periodically or non-periodically fluctuating voltage or current signals that are to be transmitted. The supply voltage node (tx_vcc) 101 provides the required supply voltage. The transistor (Qp) 104 is used as an impedance switch. The resistor (Rb) 103 is connected between the digital input signal node (tx_in) 102 and the transistor (Qp) 104. The resistor (Rb) 1103 represents a current limiting device. The capacitor (Cc) 105 is connected between the digital input signal node (tx_in) 102 and the output signal node (tx_out) 106.

The transistor (Qp) 104 functions as an open switch when a voltage potential at the digital input signal node (tx_in) 102 is held at the supply voltage node (tx_vcc) 101. Further the transistor (Qp) 104 functions as a closed switch when the voltage potential at the digital input signal node (tx_in) 102 is reduced than the supply voltage node (tx_vcc) 101 by the conduction threshold.

The resistor (Rb) 103 is adapted to function as a protection device by limiting the current entering the base of the transistor (Qp) 104 when the voltage potential at the digital input signal node (tx_in) 102 and the supply voltage node (tx_vcc) 101 is much higher than the conduction threshold.

The sudden changes in impedance between the digital input signal node (tx_in) 102 and the supply voltage node (tx_vcc) 101 causes instantaneous charge transfers to and from the output signal node (tx_out) 106. This can either be through the intrinsic coupling of the transistor terminal or using an external capacitor (Cc) 105. The charge transfer is controlled by using the external capacitor (Cr) 105. The simultaneous impedance changes and the charge transfer causes charge imbalance on the connected conductor. And if the conductor connected to the output signal node (tx_out) 106 is sufficiently long, the generated disturbance is transmitted across it as a propagating wave. Hence the electrical signal at the digital input signal node (tx_in) 102 is converted into a propagating wave m a single conductor connected to the output signal node (tx_out) 106.

An antenna 107 is provided at the output signal node, is in connection with a conducting wire. By introducing multiple bends in the wire (W1), increasing the surface area of the wire (W1) and leaving the wire (W1) un-terminated, a part of the energy is scattered into the surrounding medium. A standard radio receiver designed for the same frequency range receives the scattered energy, provided the antenna is placed in the proximity of the wire (W1).

According to one embodiment herein, the switching transistor is at least one of a NPN transistor, a PNP transistor, an NMOS transistor, a PMOS transistor, a MOSFET transistor, a bipolar transistor or any voltage or current controlled switch.

Here the input data signal is one of an AC signal or a DC logic signal. Amplitude, a phase and a frequency of the input signal are varied according to a data obtained from the source network.

Figure 1B:
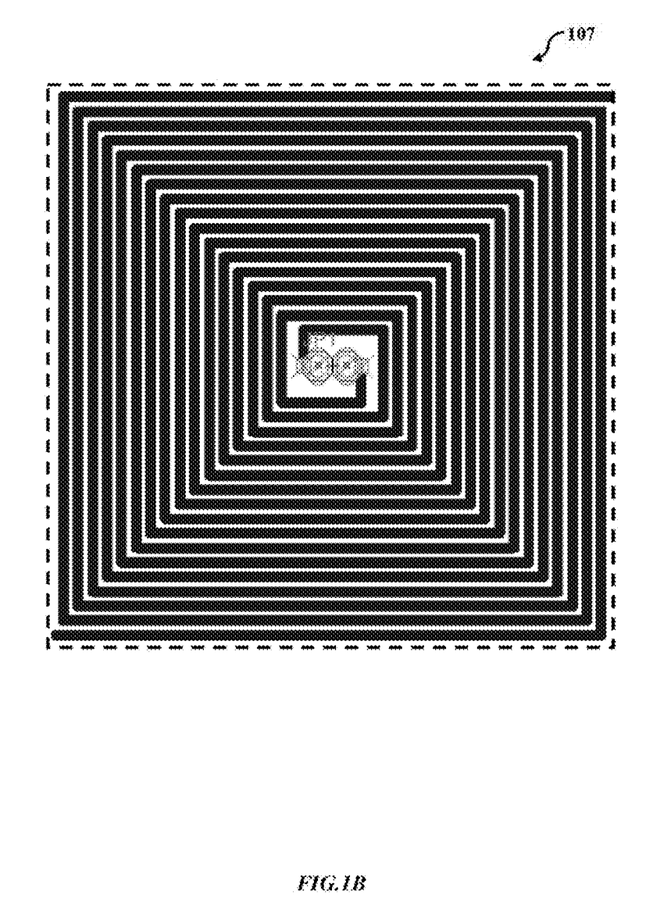
FIG. 1B is an enlarged layout of an antenna structure depicted in FIG. 1A.

FIG. 1B is an enlarged layout of an antenna structure depicted in FIG. 1A. The enlarged layout 107 represents a dual square spiral forming an antenna that is suitable for measurement of scattered electromagnetic waves. The layout illustrates the irregularities introduced in the conductor such as multiple bends in the wire, increasing the surface area of the wire and leaving the wire un-terminated, a part of the energy is scattered into the surrounding medium.

Figure 2:
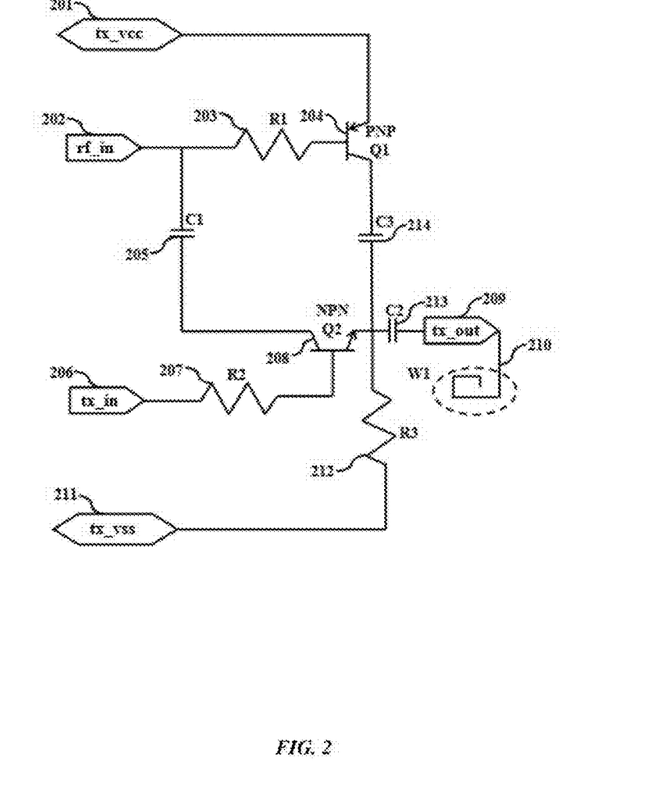
FIG. 2 is a schematic diagram illustrating a short range amplitude modulation transmitter circuit, according to one embodiment herein.

FIG. 2 is a block diagram illustrating a short range amplitude modulation transmitter circuit, according to an embodiment herein. With respect to FIG. 2, the short range amplitude modulation transmitter circuit comprises a first switching transistor (Q1) 204, a second switching transistor (Q2) 208, a first resistor (R1) 203, a second resistor (R2) 207, a third resistor (R3) 212, a first capacitor (C1) 205, a second capacitor (C2) 213, a third capacitor (C3) 214, a first input node (rf_in) 202, a second input node (tx_in) 206, a supply voltage node (tx_vcc) 201, a ground node (tx_vss) 211 at the transmitting end and an output signal node (tx_out) 209. The output signal node (tx_out) 209 is connected to a wire (W1) 210 of reasonable length.

The radio frequency carrier signal is connected to the first input node (rf_in) 202 and the input data signal used to modulate the carrier wave is connected to the second input node (tx_in) 206. The second switching transistor (Q2) 208 functions as an open circuit when the input data signal at the second input node in (tx_in) 206 is lower than the predetermined threshold value. The charge injected to the output signal node (tx_out) 209 when the first switching transistor (Q1) 204 is conducting is limited by the intrinsic Base-Collector capacitance of the first switching transistor (Q1) 204.

The second switching transistor (Q2) 208 also functions as a closed circuit when the input data signal at the second input node (tx_in) 206 is higher than the predetermined threshold value. Therefore, the second switching transistor (Q2) 208 becomes conducting and there is an additional coupling via the first capacitor (C1) 205. As a result, an amplitude modulated version of the carrier wave appears at the output signal node (tx_out) 209.

The second capacitor (C2) 213 is also used for AC coupling to the antenna. The third resistor (R3) 212 provides DC biasing stability of the second switching transistor (Q2) 208.

The third resistor (R3) 212. ensures a better conduction through the second switching. transistor (Q2) 208 when the second input node (tx_in) 206 is high.

The third capacitor (C3) 214 prevents the DC current flow from the first switching transistor (Q1) 204 to the third resistor (R3) 212.

When the output signal node (tx_out) 209 is connected to to the wire (W1) 210, there is an instantaneous electron density variation at the output signal node (tx_out) 209. As a result, a propagating wave is set up. The propagating wave is transmitted across the length of the wire (W1) 210. The length of the wire (W1) 210 acts as a waveguide for the propagating wave. However, irregularities in the transmission medium of the conductor [wire (W1)] 210 and any sharp bends will result in scattering. By introducing multiple bends in the wire (W1) 210, increasing the surface area of the wire (W1) 210 and leaving the wire (W1) 210 un-terminated, a part of the energy is scattered into the surrounding medium. This circuit acts as a short range amplitude modulation transmitter circuit.

According to an embodiment herein, any standard radio receiver designed for the same frequency range receives the scattered energy, provided the antenna is placed in the proximity of the wire (W1) 210.

According to an embodiment herein, the third resistor (R3) 212, the second capacitor (C2) 213 and the third capacitor (C3) 214 are the optional components.

Figure 3A:
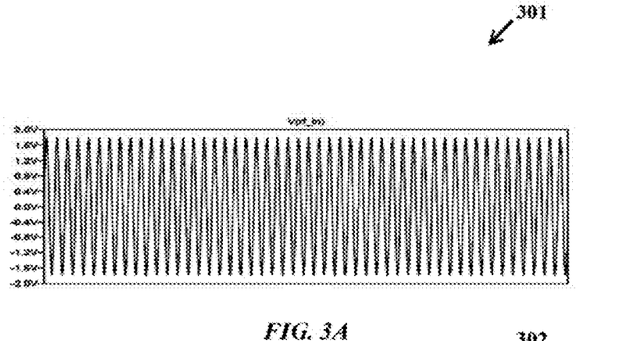
FIG. 3A illustrates a signal waveform of a radio frequency carrier signal, according to one embodiment herein.

FIG. 3A illustrates a signal waveform of a radio frequency carrier signal, according to one embodiment herein. With respect to FIG. 3A, a graphical representation of the radio frequency carrier signal V(rf_in) 301 is to shown. The frequency carrier signal V(rf_in) 301 is provided at the first input node (rf_in).

Figure 3B:
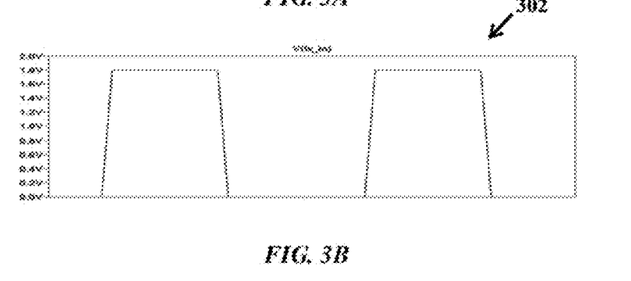
FIG. 3B illustrates a signal waveform of an input data signal to be transmitted over a single wire transmission line, according to one embodiment herein.

FIG. 3B illustrates a signal waveform of an input data signal to be transmitted over a single wire transmission line, according to one embodiment herein. With respect to FIG. 3B, a graphical representation of the is input signal V(tx_in) 302 is shown. The input signal V(tx_in) 302 is provided at the second input node (tx_in). The input signal V(tx_in) 302 can be of any shape like square wave, triangular wave, sinusoidal wave etc, but preferably line encoded to avoid a DC bias shift.

Figure 3C:
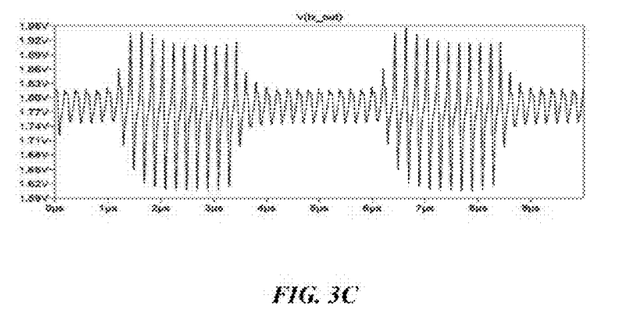
FIG. 3C illustrates a signal waveform of a modulated output signal (propagating wave), according to one embodiment herein.

FIG. 3C illustrates a signal waveform of a modulated output signal (propagating wave), according to one embodiment herein. With respect to FIG. 3C, a graphical representation of the modulated output signal V(tx_out) 303 is shown. The modulated output signal V(tx_out) 303 is provided at the output signal node (tx_out).

Figure 4:
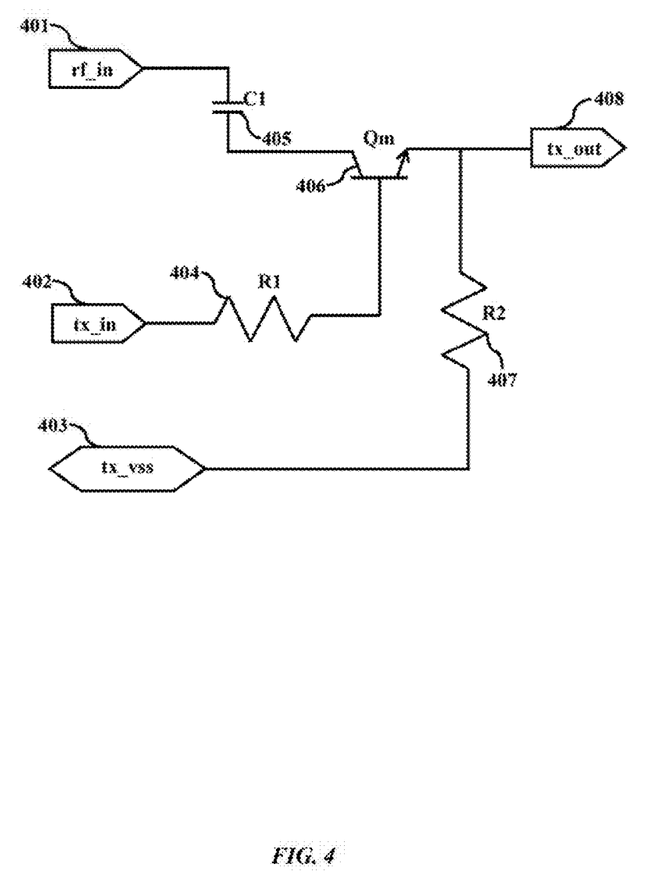
FIG. 4 is a block diagram illustrating an impedance switching amplitude modulation circuit, according to one embodiment herein.

FIG. 4 is a block diagram illustrating impedance switching amplitude modulation circuit, according to one embodiment herein. With respect to FIG. 4, the impedance switching amplitude modulation circuit comprises a first input node (rf_in) 401, a capacitor (C1) 405, a switching transistor (Qm) 406, a first resistor (R1) 404, a second resistor (R2) 407, a second input node (tx_in) 402, a ground node (tx_vss) 403 at the transmission end and an output signal node (tx_out) 408. If the output driver of the radio frequency carrier source already consists of impedances being switched at the radio frequency; even then a modulated propagating wave may be generated using the reduced circuit as shown in FIG. 4. The amount of charge that gets transferred to the output signal node (tx_out) 408 is controlled by the second input node (tx_in) 402 using switching transistor (Qm) 406 resulting in an amplitude modulated signal.

Figure 5:
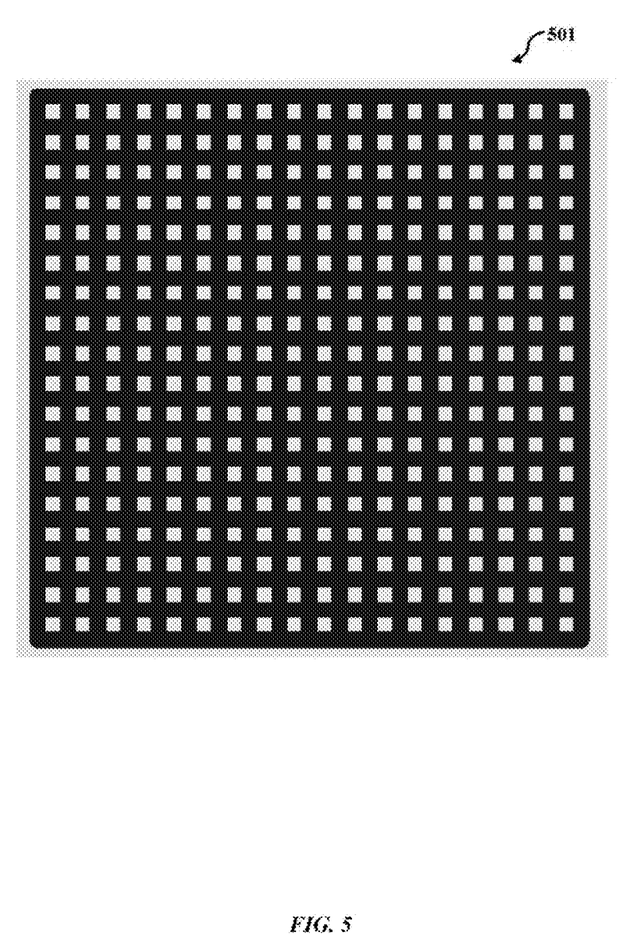
FIG. 5 illustrates a layout of a printed antenna, according to an exemplary embodiment herein.

FIG. 5 illustrates a layout of a printed antenna, according to an exemplary embodiment herein. The layout 501 is a mesh structure having a high surface area and multiple edges that increases the scattering energy.

Figure 6:
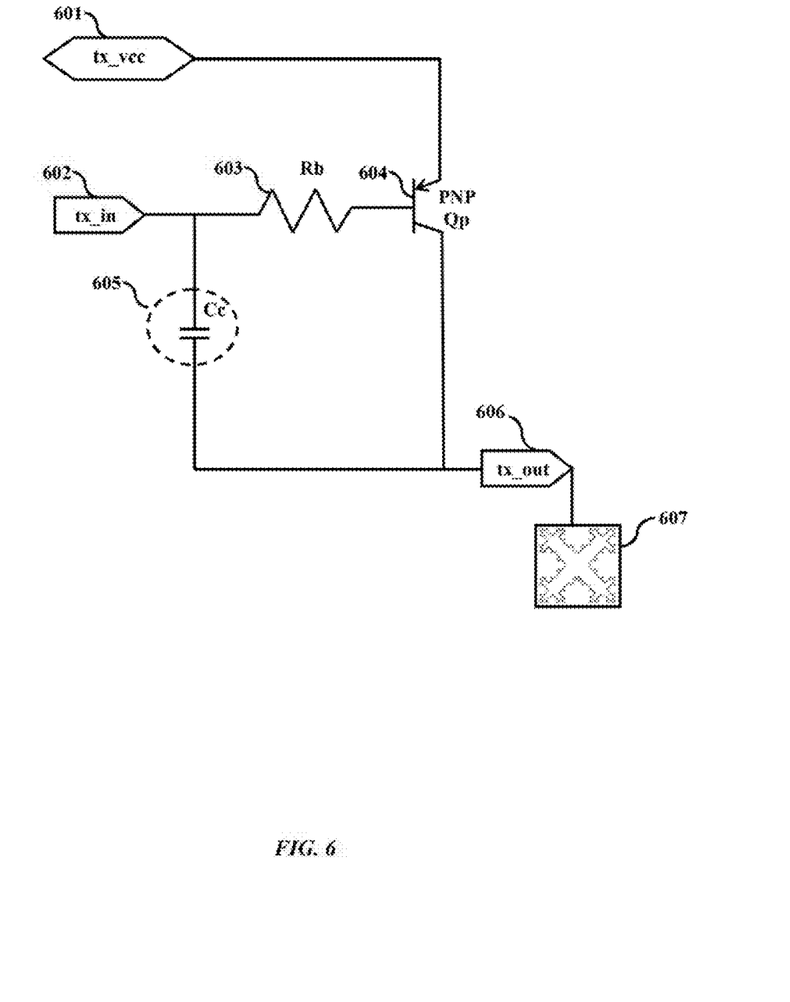
FIG. 6 illustrates a layout of a fractal antenna, according to another exemplary embodiment herein.

FIG. 6 illustrates a layout of a fractal antenna, according to another exemplary embodiment herein. With respect to FIG. 6, the impedance modulation circuit comprises a digital input signal node (tx_in) 602, a supply voltage node (tx_vcc) 601, a capacitor (Cc) 605, a resistor (Rb) 603 and a transistor (Qp) 604 at the transmitting end. The receiving end comprises an output signal node (tx_out) 606 and a fractal antenna 607 provided at the output signal node 606, is in connection with the conducting wire. The fractal antenna herein is used as a short range antenna by relying on EM scattering and direct emission from the conductor wire. The irregularities in the medium, the to increased surface area and sharp bends in the structure of the fractal antenna in turn increases scattering.

Although circuit diagrams have been shown only for short range AM transmitters, this general scheme may be used to transmit electrical AC signals employing any form of modulation or even un-modulated signals is wirelessly across short distances by the following 2-step process; Step 1: Converting input electrical signal to propagating wave on a single conductor; and Step 2: Transmitting the propagating wave on a single conductor/wire used as an antenna by means of scattering and direct emission resulting in wireless electromagnetic waves.

According to one embodiment herein, the scattered energy in the form of electromagnetic waves is a significant advancement for near field communication (NFC), radio frequency identification (RFID), Wireless Fidelity (Wi-Fi), Bluetooth etc.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments.

It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the claims.

Although the embodiments herein are described with various specific embodiments, it will be obvious for a person skilled in the art to practice the invention with modifications. However, all such modifications are deemed to be within the scope of the claims.

It is also to be understood that the following claims are intended to cover all of the generic and specific features of the embodiments described herein and all the statements of the scope of the embodiments which as a matter of language might be said to fall there between.

What is claimed is:

1. A system for providing short wireless communication, the system comprises:
    a transmitting end;
    a first electrical circuitry provided at the transmitting end to generate a propagating EM wave on a connected wire according to an input data signal;
    a transmitting antenna provided at the transmitting end designed to maximize scattering of the propagating EM wave, and wherein the transmitting antenna is a single wire transmission line for transmitting the generated propagating wave, and wherein the single wire transmission line is designed with a plurality of bends, and wherein the single wire transmission line is a non-terminated wire;
    a receiving end;
    a receiving antenna provided at the receiving end to detect the scattered EM waves; and
    a second electrical circuitry provided at the receiving end to recover the input data signal from the signal received by the receiving antenna, wherein a wireless link is established by the scattered EM waves generated by near field emissions from a surface of the transmitting antenna, and wherein the scattered EM waves are generated from the single wire transmission line.

2. The system of claim 1, wherein the transmitting antenna and the receiving antenna are conductor strips with a plurality of bends and high surface area.

3. The system of claim 1, wherein the transmitting antenna and the receiving antenna are fractal antennas.

4. The system of claim 1, wherein the transmitting antenna and the receiving antenna are adapted to provide long range directional radio links.

5. A method for providing a short range wireless communication, the method comprises steps of:
    providing, a radio frequency (RF) carrier signal to a first input node;
    providing an input data signal to be transmitted to a second input node;
    generating an electrical disturbance using the input data signal;
    transmitting the signal disturbance to an output signal node;
    generating propagating wave at the output signal node; and
    transmitting the generated propagating wave through a single wire transmission line;
    wherein a scattering of energy from the single wire transmission line is achieved by introducing a plurality of bends in the wire, increasing the surface area of the wire and leaving the wire un-terminated, and wherein a wireless link is established by the scattered EM waves generated by near field emissions from surface of the transmitting antenna, and wherein the transmitting antenna and the receiving antenna are conductor strips with a plurality of bends and high surface area.

* * * * *